United States Patent
Shimizu et al.

(10) Patent No.: US 6,982,990 B2
(45) Date of Patent: Jan. 3, 2006

(54) TRANSMITTING METHOD, TRANSMITTING APPARATUS, AND PROGRAM STORAGE MEDIUM

(75) Inventors: Kunitoshi Shimizu, Kanagawa (JP); Hisato Shima, Tokyo (JP)

(73) Assignee: Sony Corporation, Tokyo (JP)

( * ) Notice: Subject to any disclaimer, the term of this patent is extended or adjusted under 35 U.S.C. 154(b) by 848 days.

(21) Appl. No.: 09/938,152

(22) Filed: Aug. 23, 2001

(65) Prior Publication Data

US 2002/0067719 A1    Jun. 6, 2002

(30) Foreign Application Priority Data

Aug. 25, 2000  (JP) ............................. 2000-255424

(51) Int. Cl.
*H04J 3/26* (2006.01)

(52) U.S. Cl. ...................................... 370/471; 370/474

(58) Field of Classification Search ................ 370/470, 370/471, 474, 476
See application file for complete search history.

(56) References Cited

U.S. PATENT DOCUMENTS

| | | | | |
|---|---|---|---|---|
| 6,711,181 | B1 * | 3/2004 | Xue et al. ................... | 370/504 |
| 2004/0151478 | A1 * | 8/2004 | Yoo et al. ................... | 386/111 |
| 2005/0041606 | A1 * | 2/2005 | Hori et al. .................. | 370/299 |

* cited by examiner

*Primary Examiner*—Melvin Marcelo
(74) *Attorney, Agent, or Firm*—Frommer Lawrence & Haug LLP; William S. Frommer; Thomas F. Presson

(57) ABSTRACT

A CPU controls the storage of isochronous packets into a main memory. The CPU inserts a nullpacket, which will be ignored by a reception apparatus, into isochronous packets so that the isochronous packets have the same size. A 1394 DMA controller controls the transmission of stored isochronous packets, which have the same size due to the inserted nullpacket, over a 1394 bus.

16 Claims, 9 Drawing Sheets

| NullPacket() { | No. of bits | Value |
|---|---|---|
| sync_byte | 8 | 0x47 |
| transport_error_indicator | 1 | 0 |
| payload_unit_start_indicator | 1 | 0 |
| tansport_priority | 1 | 0 |
| PID | 13 | 0x1fff |
| Transport_scrambling_control | 2 | 0 |
| adaptation_field_control | 2 | 0 |
| countinuity_counter | 4 | 0 |
| for(i=0;i<184;1++) { | | |
| data_byte | 8 | 0xff |
| } | | |
| { | | |

FIG.9

TRANSMITTING METHOD, TRANSMITTING APPARATUS, AND PROGRAM STORAGE MEDIUM

BACKGROUND OF THE INVENTION

The present invention relates to a transmitting apparatus, a transmitting method, and a program storage medium, and more particularly to an apparatus for and a method of transmitting packets of data and a program storage medium.

When a transmitting apparatus for isochronously transmitting data via a bus based on the standards of IEEE (Institute of Electrical and Electronic Engineers) 1394 (hereinafter referred to as "1394 bus") transmits MPEG (Moving Picture Experts Group) 2-TS (Transport Stream) data, a dedicated CPU (Central Processing Unit) monitors the cycle time of the 1394 bus to control the size of data to be transmitted.

Some personal computers are equipped with a 1394 interface. To meet demands for inexpensive 1394 interfaces, the 1394 interfaces do not have a dedicated CPU, and packets whose size has been controlled are transmitted to the 1394 bus by a general-purpose 1394 DMA (Direct Memory Access) controller.

Figure 1:
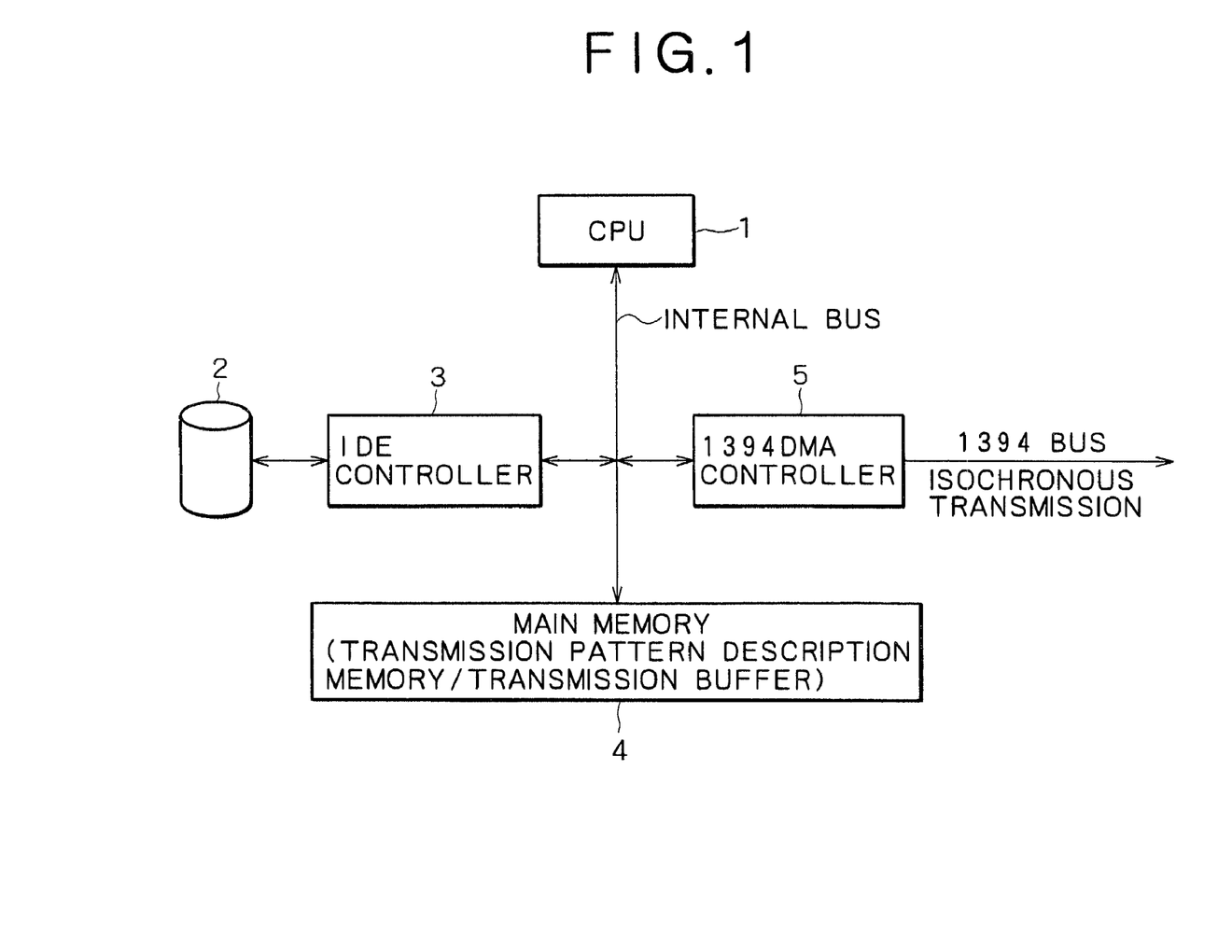
FIG. 1 is a block diagram of a conventional transmitting apparatus for isochronously transmitting data.

FIG. 1 of the accompanying drawings is a block diagram showing a conventional transmitting apparatus for isochronously transmitting data via a 1394 bus by means of a 1394 DMA controller.

As shown in FIG. 1, a CPU 1 controls an IDE (Integrated Drive Electronics) controller 3 to read MPEG2-TS data (hereinafter also referred to as "TSP (Transport Stream Packet)") from a storage device 2, and stores the read MPEG2-TS data together with a CIP (Common Isochronous Packet) and a SPH (Source Packet Header) as isochronous packets in a main memory 4.

The CPU 1 stores a description of a transmission pattern representing the arrangement of isochronous packets storing TSPs, in the main memory 4.

Figure 2:
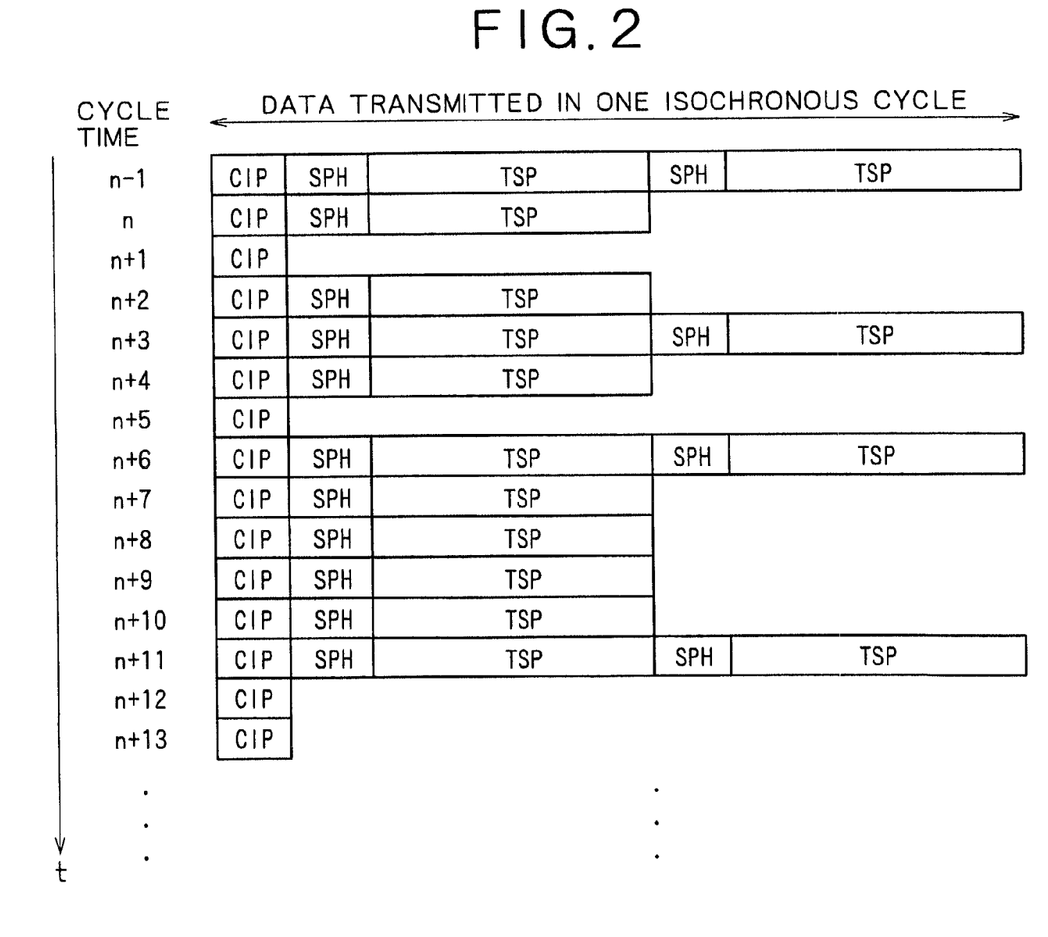
FIG. 2 is a diagram showing isochronous packets to be transmitted by the conventional transmitting apparatus.

FIG. 2 of the accompanying drawings is a diagram showing isochronous packets transmitted from the transmitting apparatus. Isochronous packets that are isochronously transmitted on the 1394 bus comprise a combination of CIPs, SPHS, and TSPs.

An isochronous packet in a cycle time n (corresponding to one cycle of isochronous transmission on the 1394 bus) shown in FIG. 2 comprises one CIP, one SPH, and one TSP. An isochronous packet in a cycle time n+1 shown in FIG. 2 comprises one CIP only.

An isochronous packet in a cycle time n+3 shown in FIG. 2 comprises one CIP, two SPHs, and two TSPs.

Figure 3:
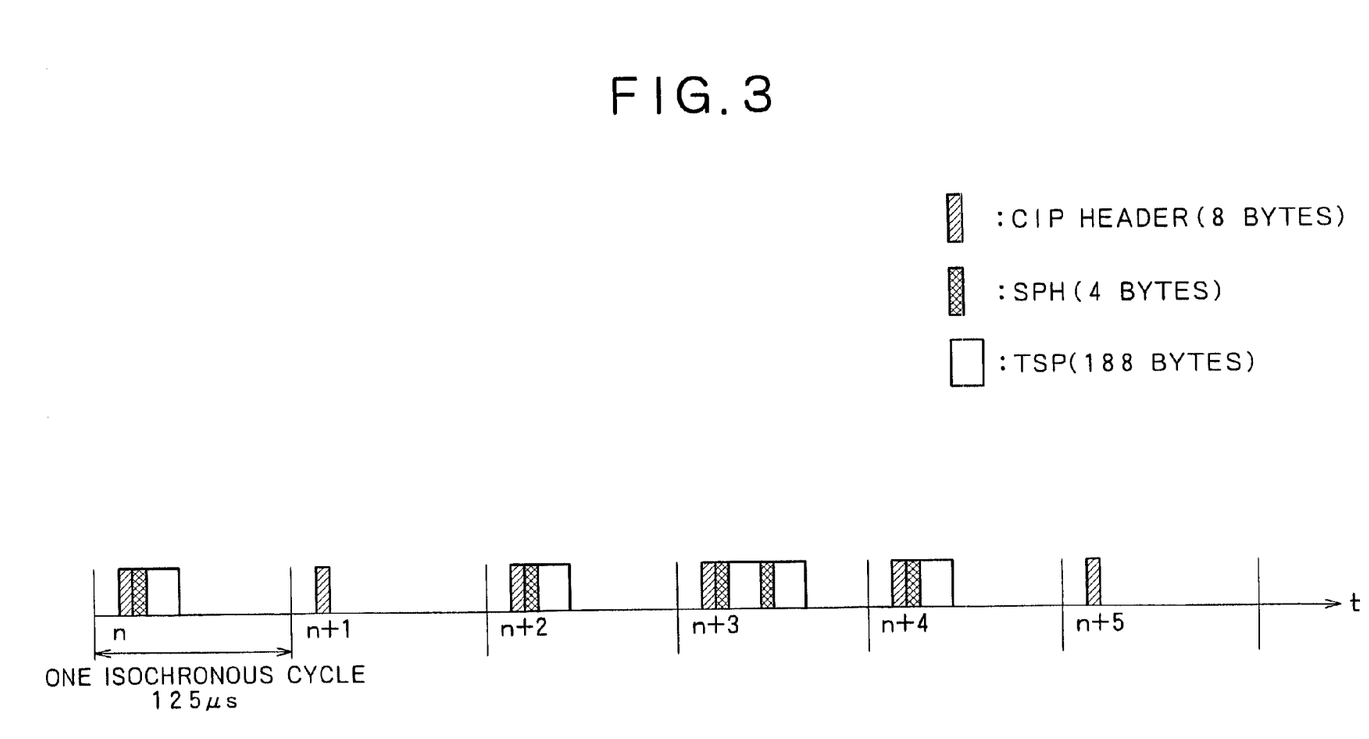
FIG. 3 is a timing chart showing the conventional timing of transmission of isochronous packets on a 1394 bus.

FIG. 3 of the accompanying drawings is a timing chart showing the timing of transmission of isochronous packets on the 1394 bus which are carried out corresponding to the isochronous packets shown in FIG. 2.

The isochronous packets transmitted in respective cycles of isochronous transmission on the 1394 bus may not necessarily have the same size. The transmission pattern representing the arrangement of isochronous packets is stored in a transmission pattern description memory area of the main memory 4.

The CPU 1 controls a 1394 DMA controller 5 to transmit isochronous packets stored in the main memory 4 over the 1394 bus based on the transmission pattern stored in the transmission pattern description memory area of the main memory 4.

The IDE controller 3 controls the recording of data in and the reading of data from the storage device 2, records data supplied from the CPU 1 or the 1394 DMA controller 5 in the storage device 2, and supplies data read from the storage device 2 to the CPU 1 or the main memory 4.

The main memory 4 has a transmission buffer area as well as the transmission pattern description memory area.

Based on a transmission pattern stored in the transmission pattern description memory area of the main memory 4, the 1394 DMA controller 5 reads, by way of DMA transfer, isochronous packets stored in the transmission buffer of the main memory 4 in synchronism with isochronous transmission cycles on the 1394 bus, and transmits the read isochronous packets over the 1394 bus.

Figure 4:
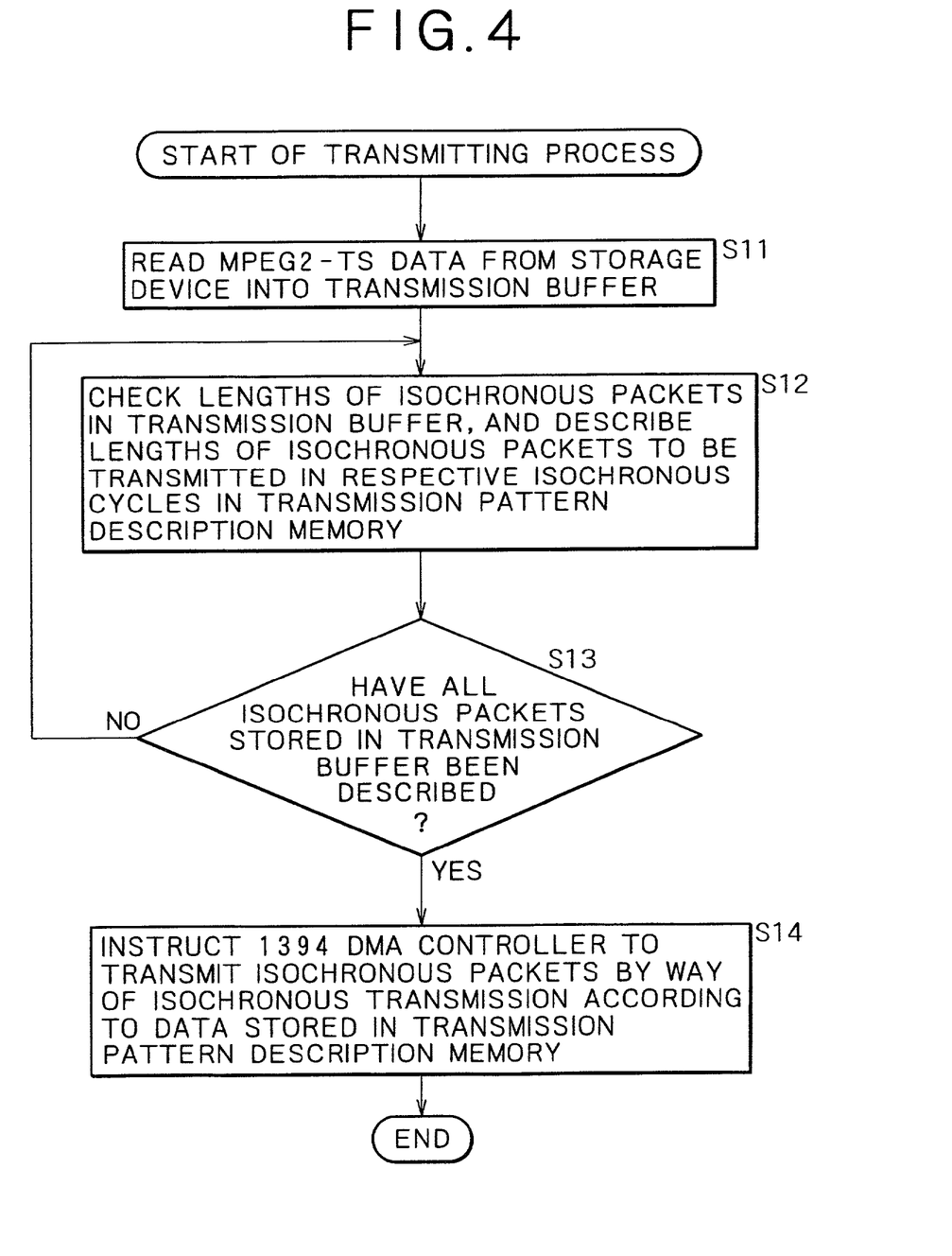
FIG. 4 is a flowchart of a processing sequence of a transmission process carried out by the conventional transmitting apparatus.

A transmission process carried out by the CPU 1 will be described below with reference to a flowchart shown in FIG. 4 of the accompanying drawings.

In step S11, the CPU 1 controls the IDE controller 3 to read MPEG2-TS data from the storage device 2 into the transmission buffer of the main memory 4. The MPEG2-TS data, which is read into the transmission buffer of the main memory 4 are handled as isochronous packets.

In step S12, the CPU 1 checks the lengths of isochronous packets in the transmission buffer, and describes the lengths of isochronous packets to be transmitted in respective isochronous cycles in the transmission pattern description memory.

In step S13, the CPU 1 determines whether or not all the isochronous packets stored in the transmission buffer have been described. If it is determined that not all the isochronous packets stored in the transmission buffer have been described, then control goes back to step S12 to repeat the process of describing the lengths of the isochronous packets.

If all the isochronous packets stored in the transmission buffer have been described in step S13, then control goes to step S14. The CPU 1 instructs the 1394 DMA controller 5 to send the isochronous packets by means of isochronous transmission according to the data stored in the transmission pattern description memory. Then, the processing sequence shown in FIG. 4 is put to an end.

The process of describing the transmission pattern of all the isochronous packets requires a large memory capacity for storing the isochronous packets to be transmitted, and results in a large processing load for checking the lengths of the isochronous packets.

SUMMARY OF THE INVENTION

It is therefore an object of the present invention to provide a transmitting apparatus, a transmitting method, and a program storage medium for transmitting packets with fewer resources.

According to the present invention, there is provided a method of transmitting a packet, comprising the steps of measuring the length of a data packet stored in a device, generating an additional packet having a length which is equal to the difference between the measured length and a predetermined packet length, coupling the data packet and the additional packet to each other, producing a second packet having a predetermined length, transferring the second packet to a transmission buffer, and transmitting the second packet.

According to the present invention, there is also provided an apparatus for transmitting a packet, comprising means for measuring the length of a data packet stored in a device, means for generating an additional packet having a length which is equal to the difference between the measured length and a predetermined packet length, means for coupling the data packet and the additional packet to each other, producing a second packet having a predetermined length, means for transferring the second packet to a transmission buffer, and means for transmitting the second packet.

According to the present invention, there is further provided a program for transmitting a packet, comprising the steps of measuring the length of a data packet stored in a device, generating an additional packet having a length which is equal to the difference between the measured length and a predetermined packet length, coupling the data packet and the additional packet to each other, producing a second packet having a predetermined length, transferring the second packet to a transmission buffer, and transmitting the second packet.

According to the present invention, there is also provided a storage medium for storing a program for transmitting a packet, the program comprising the steps of measuring the length of a data packet stored in a device, generating an additional packet having a length which is equal to the difference between the measured length and a predetermined packet length, coupling the data packet and the additional packet to each other, producing a second packet having a predetermined length, transferring the second packet to a transmission buffer, and transmitting the second packet.

The additional packet comprises a nullpacket.

The data packet comprises a packet according to MPEG standards and the second packet comprises a packet according to IEEE 1394 standards.

The predetermined length of the second packet is represented by 392 bytes.

The above and other objects, features, and advantages of the present invention will become apparent from the following description when taken in conjunction with the accompanying drawings which illustrate a preferred embodiment of the present invention by way of example.

DESCRIPTION OF THE PREFERRED EMBODIMENT

Figure 5:
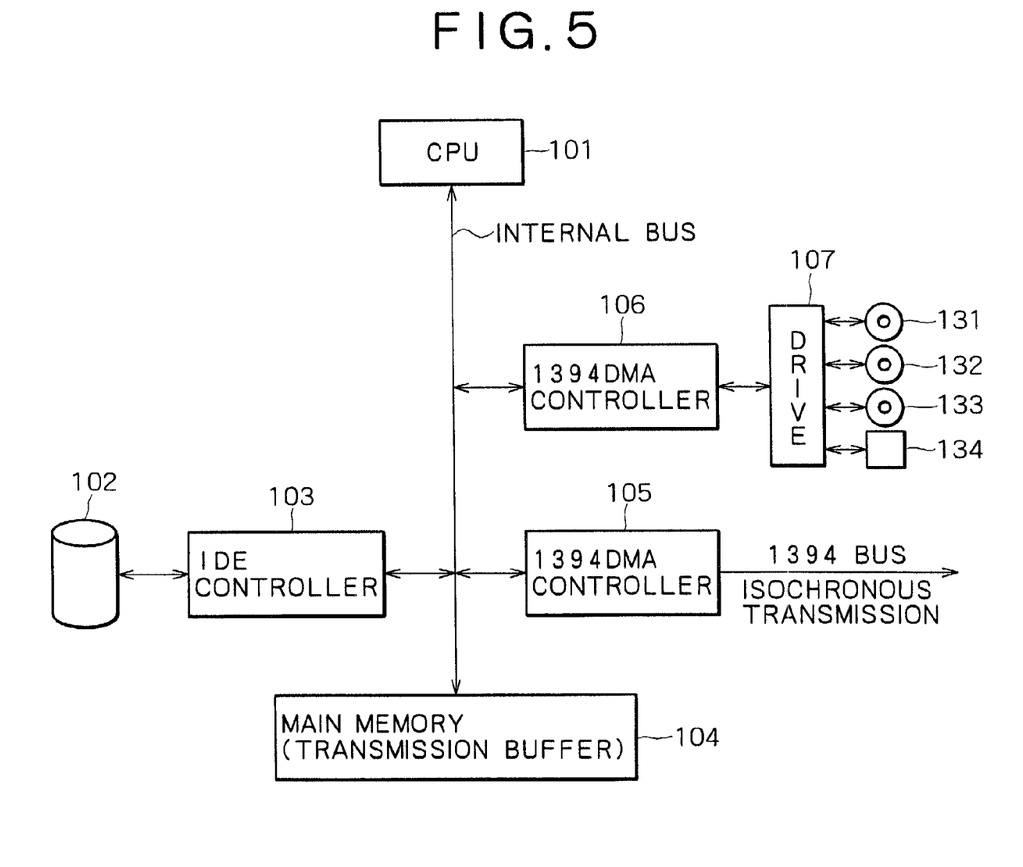
FIG. 5 is a block diagram of a transmitting apparatus according to an embodiment of the present invention.

FIG. 5 shows in block form a transmitting apparatus according to an embodiment of the present invention for transmitting data via a 1394 bus by means of isochronous transmission.

As shown in FIG. 5, the transmission apparatus has a CPU 101 for controlling the transmission apparatus in its entirety. The CPU 101 executes a transmission program to control an IDE controller 103 to read MPEG2-TS data from a storage device 102 and stores the read MPEG2-TS data as TSPs together with CIPs, SPHs, and nullpackets, which are handled altogether as isochronous packets, in a transmission buffer of a main memory 104.

Figure 6:
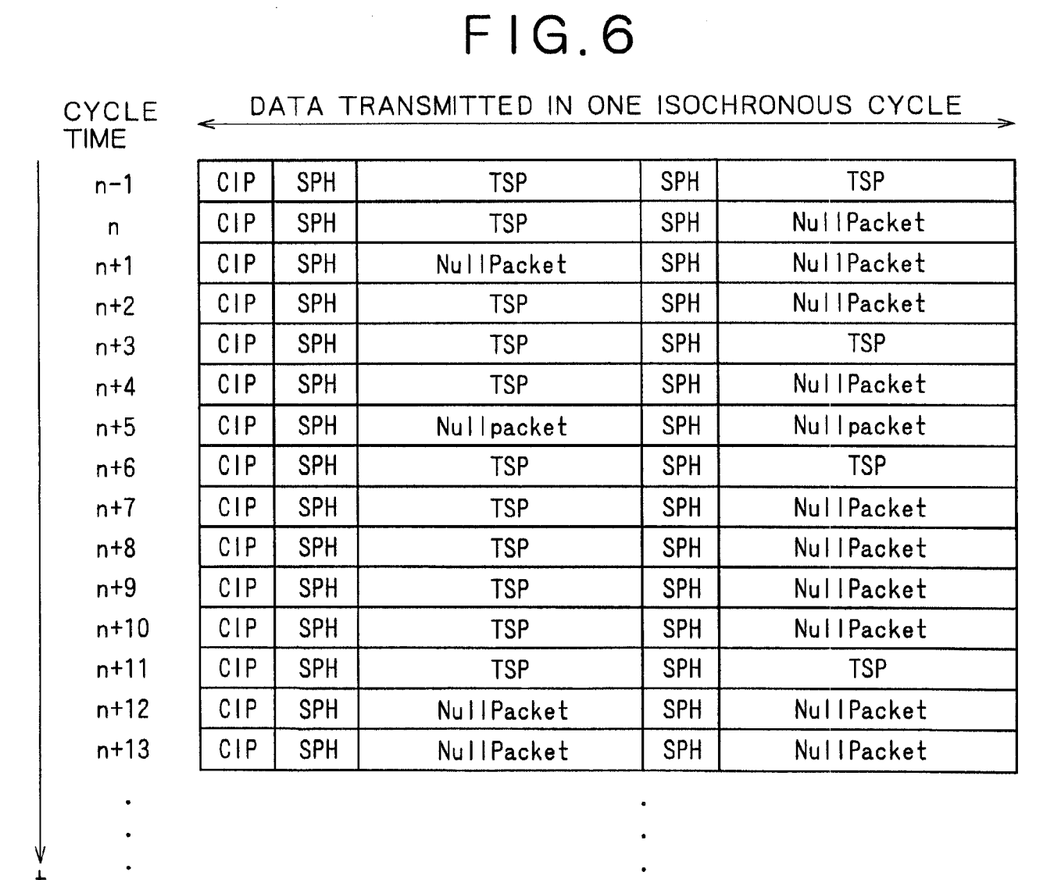
FIG. 6 is a diagram showing isochronous packets stored in a transmission buffer of a main memory of the transmitting apparatus shown in FIG. 5.

FIG. 6 shows isochronous packets stored in the transmission buffer of the main memory 104. The isochronous packets stored in the transmission buffer of the main memory 104 comprise a combination of CIPs, SPHs, TSPs, and nullpackets.

The isochronous packets stored in the transmission buffer of the main memory 104 comprise either one CIP, one SPH, one nullpacket, one SPH, and one nullpacket, or one CIP, one SPH, one TSP, one SPH, and one nullpacket, or one CIP, one SPH, one TSP, one SPH, and one TSP.

The CIP is made up of 8 bytes, the SPH of 4 bytes, the TSP of 188 bytes, and the nullpacket of 188 bytes. Therefore, each of the isochronous packets stored in the transmission buffer of the main memory 104 is made up of 392 bytes.

Figure 7:
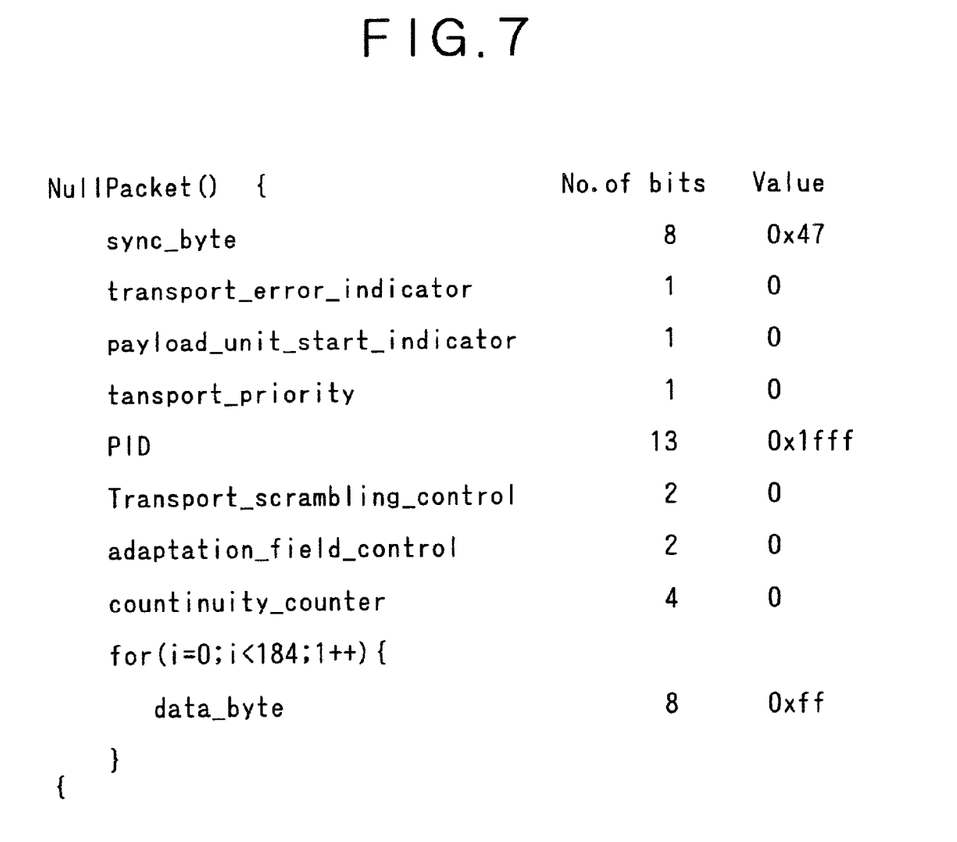
FIG. 7 is a diagram illustrative of details of a nullpacket.

FIG. 7 shows details of the nullpacket. The nullpacket comprises a sync_byte, a transport_error_indicator, and a PID, is MPEG2-TS data that is ignored when the isochronous packet is decoded.

When a reception apparatus receives a TSP, it extracts a PID included in the TSP. If the extracted PID is 0x1fff, then the reception apparatus judges the TSP as a nullpacket and discard the TSP as the nullpacket. If the extracted PID is not 0x1fff, then the reception apparatus uses data stored in the TSP.

Figure 8:
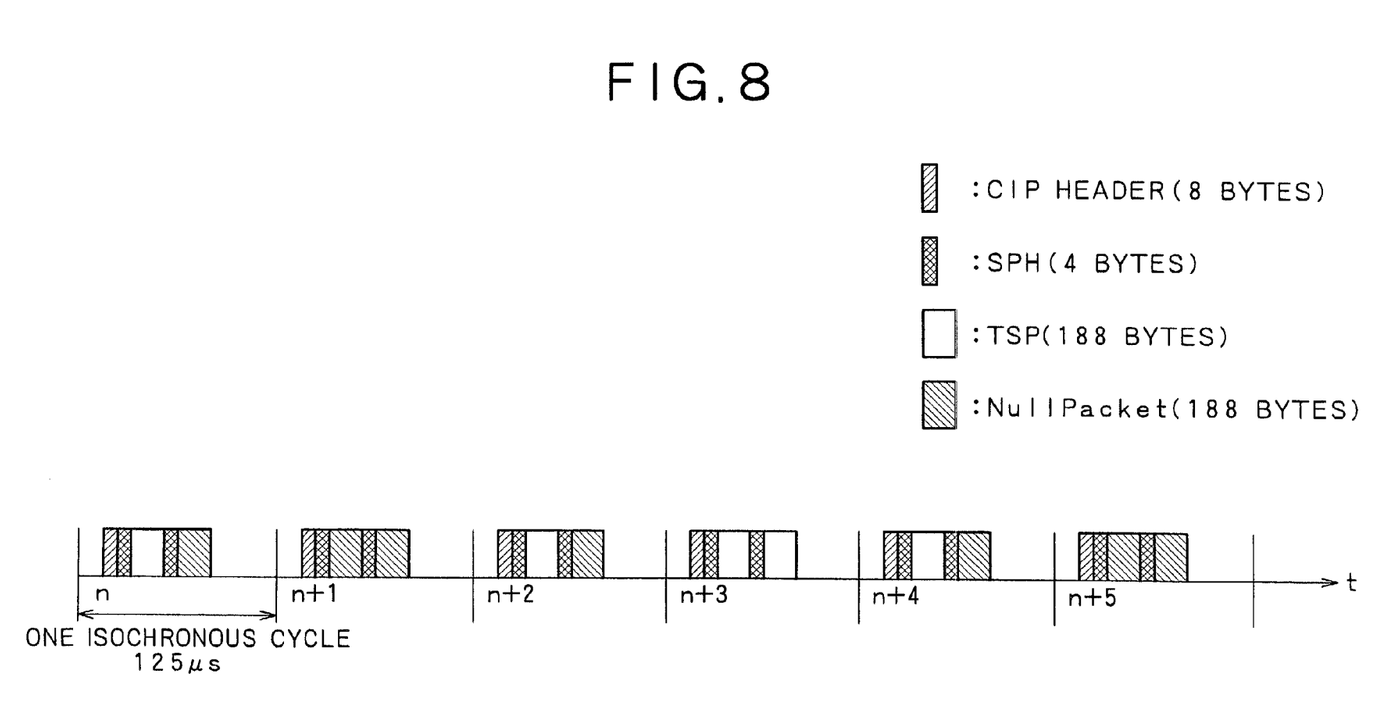
FIG. 8 is a timing chart showing the timing of transmission of isochronous packets on a 1394 bus in the transmitting apparatus shown in FIG. 5.

FIG. 8 is a timing chart of the timing of transmission of isochronous packets on the 1394 bus by the transmission apparatus according to the present invention.

The isochronous packets transmitted in respective cycles of isochronous transmission on the 1394 bus have the same size of 392 bytes. An isochronous bandwidth resource used for isochronous transmission on the 1394 bus is maintained to match the maximum size of isochronous packets transmitted by means of isochronous transmission. Therefore, even when a nullpacket is stored in an isochronous packet, the isochronous bandwidth resource used for isochronous transmission is not consumed wastefully.

The CPU 101 controls a 1394 DMA controller 105 to transmit isochronous packets stored in the transmission buffer of the main memory 104 over the 1394 bus.

The IDE controller 103 controls the recording of data in and the reading of data from the storage device 102, records data supplied from the CPU 101 or the 1394 DMA controller 105 in the storage device 102, and supplies data read from the storage device 102 to the CPU 101 or the main memory 104.

The main memory 104 has an area as the transmission buffer which is maintained according the transmission program executed by the CPU 101.

The 1394 DMA controller 105 reads, by way of DMA transfer, isochronous packets of the same size stored in the transmission buffer of the main memory 104 in synchronism with isochronous transmission cycles on the 1394 bus, and transmits the read isochronous packets over the 1394 bus.

A drive 107 reads data or a program, i.e., the transmission program executed by the CPU 101, from a magnetic disk 131, an optical disk 132, a magneto-optical disk 133, or a semiconductor memory 134, and supplies the read data or program via an interface 106 to the CPU 101 or the main memory 104.

The components of the transmission apparatus, ranging from the CPU 101 to the interface 106, are connected to each other by an internal bus.

Figure 9:
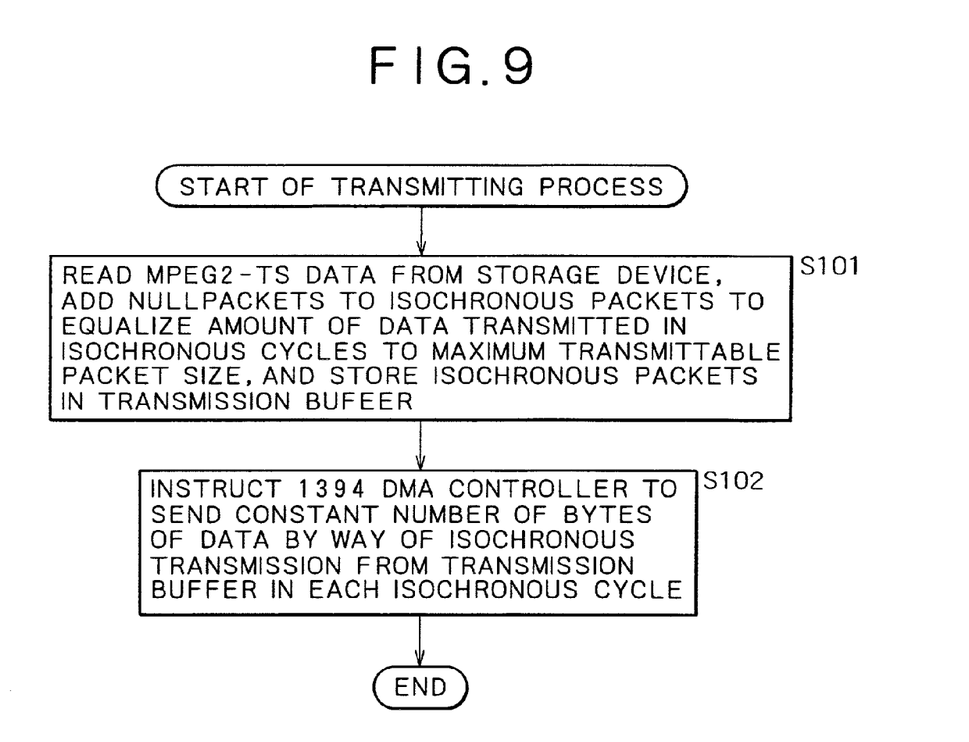
FIG. 9 is a flowchart of a processing sequence of a transmission process carried out according to a transmission program.

A transmission process according to the transmission program executed by the CPU 101 will be described below with reference to a flowchart shown in FIG. 9.

In step S101, the transmission program causes the IDE controller 103 to read MPEG2-TS data from the storage device 102, adds nullpackets to isochronous packets in order to equalize the amounts of data transmitted in respective isochronous cycles to a maximum transmittable packet size, and stores the isochronous packets in the transmission buffer of the main memory 104.

In step S102, the transmission program instructs the 1394 DMA controller 105 to send a constant number of bytes of data from the transmission buffer by means of isochronous transmission in each isochronous cycle. Then, the processing sequence is finished.

As described above, the transmission apparatus according to the present invention does not require a complex control process for transmitting isochronous packets of different sizes in isochronous cycles, but is able to transmit isochronous packets storing MPEG2-TS data over the 1394 bus with fewer resources.

The above processing sequence can be implemented by either hardware or software. If the processing sequence is implemented by software, the program for the software is installed from a program storage medium into a computer incorporated in dedicated hardware or a general-purpose personal computer which is capable of performing various functions with various programs installed therein.

As shown in FIG. 5, the program storage medium which stores a program to be installed in the computer and executed by the computer comprises a package medium such as the magnetic disk 131 (including a floppy disk), the optical disk 132 (including a CD-ROM (Compact Disc-Read Only Memory), a DVD (Digital Versatile Disc), the magneto-optical disk 133 (including an MD (Mini-Disc), or the semiconductor memory 134, or a ROM (not shown) for temporarily or permanently storing the program, or the storage device 102. The program is stored into the program storage medium via an interface such as a router, a modem, or the like, by means of a wired or wireless communication medium such as a local area network, the Internet, or a digital satellite broadcasting system.

The process of describing a program stored in a program storage medium comprises steps which are carried out temporally according to a defined sequence or steps which are carried out concurrently or individually.

The term "system" referred to herein is used to mean the whole of a combination of plural apparatus.

Although a certain preferred embodiment of the present invention has been shown and described in detail, it should be understood that various changes and modifications may be made therein without departing from the scope of the appended claims.

What is claimed is:

1. A method of transmitting a packet, comprising the steps of:
   measuring the length of a data packet stored in a device;
   generating an additional packet having a length which is equal to the difference between the measured length and a predetermined packet length;
   coupling said data packet and said additional packet to each other;
   producing a second packet having a predetermined length;
   transferring said second packet to a transmission buffer; and
   transmitting said second packet.

2. A method according to claim 1, wherein said additional packet comprises a nullpacket.

3. A method according to claim 1, wherein said data packet comprises a packet according to MPEG standards and said second packet comprises a packet according to IEEE 1394 standards.

4. A method according to claim 1, wherein said predetermined length of said second packet is represented by 392 bytes.

5. An apparatus for transmitting a packet, comprising:
   means for measuring the length of a data packet stored in a device;
   means for generating an additional packet having a length which is equal to the difference between the measured length and a predetermined packet length;
   means for coupling said data packet and said additional packet to each other;
   means for producing a second packet having a predetermined length;
   means for transferring said second packet to a transmission buffer; and
   means for transmitting said second packet.

6. An apparatus according to claim 5, wherein said additional packet comprises a nullpacket.

7. An apparatus according to claim 5, wherein said data packet comprises a packet according to MPEG standards and said second packet comprises a packet according to IEEE 1394 standards.

8. An apparatus according to claim 5, wherein said predetermined length of said second packet is represented by 392 bytes.

9. A program adapted to be stored on a machine-readable medium for transmitting a packet, the program comprising:
   code for measuring the length of a data packet stored in a device;
   code for generating an additional packet having a length which is equal to the difference between the measured length and a predetermined packet length;
   code for coupling said data packet and said additional packet to each other;
   code for producing a second packet having a predetermined length;
   code for transferring said second packet to a transmission buffer; and
   code for transmitting said second packet.

10. The program according to claim 8, wherein said additional packet comprises a nullpacket.

11. The program according to claim 8, wherein said data packet comprises a packet according to MPEG standards and said second packet comprises a packet according to IEEE 1394 standards.

12. The program according to claim 8, wherein said predetermined length of said second packet is represented by 392 bytes.

13. A storage medium for storing a program for transmitting a packet, said program comprising the steps of:
   measuring the length of a data packet stored in a device;
   generating an additional packet having a length which is equal to the difference between the measured length and a predetermined packet length;
   coupling said data packet and said additional packet to each other; producing a second packet having a predetermined length;
   transferring said second packet to a transmission buffer; and
   transmitting said second packet.

14. A storage medium according to claim 13, wherein said additional packet comprises a nullpacket.

15. A storage medium according to claim 13, wherein said data packet comprises a packet according to MPEG standards and said second packet comprises a packet according to IEEE 1394 standards.

16. A storage medium according to claim 13, wherein said predetermined length of said second packet is represented by 392 bytes.

* * * * *